(12) United States Patent
Nakano

(10) Patent No.: US 6,246,151 B1
(45) Date of Patent: *Jun. 12, 2001

(54) DRIVE DEVICE AND APPARATUS INCORPORATING THE DEVICE

(75) Inventor: Haruyuki Nakano, Sakai (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/185,902

(22) Filed: Nov. 4, 1998

(30) Foreign Application Priority Data

Nov. 6, 1997 (JP) .................................... 9-304482

(51) Int. Cl.[7] .................................................. H01L 41/08
(52) U.S. Cl. ....................................................... 310/316.02
(58) Field of Search ............................ 310/323.02, 328, 310/317, 316.02

(56) References Cited

U.S. PATENT DOCUMENTS

| | | | |
|---|---|---|---|
| 5,225,941 | 7/1993 | Saito et al. ........................... | 359/824 |
| 5,587,846 | 12/1996 | Miyano et al. ....................... | 359/824 |
| 5,589,723 | 12/1996 | Yoshida et al. ...................... | 310/328 |
| 5,589,732 | * 12/1996 | Yoshida et al. ...................... | 310/328 |
| 5,786,654 | * 7/1998 | Yoshida et al. ...................... | 310/328 |
| 5,821,667 | * 10/1998 | Takagi et al. ..................... | 310/328 X |
| 5,869,918 | * 2/1999 | Ashizawa .............................. | 310/328 |
| 5,890,391 | * 4/1999 | Okada .................................. | 310/328 |
| 5,907,212 | * 5/1999 | Okada .................................. | 310/328 |
| 5,912,525 | * 6/1999 | Kobayashi et al. .............. | 310/328 X |
| 5,969,464 | * 10/1999 | Nakano et al. ...................... | 310/328 |

* cited by examiner

*Primary Examiner*—Mark O. Budd
(74) *Attorney, Agent, or Firm*—Sidley & Austin

(57) ABSTRACT

The drive device has a detection circuit (15) to which drive signals are input from a drive circuit (14) that drives a piezoelectric linear actuator (12) and that detects the characteristic of the drive signals regarding a prescribed factor and outputs detected characteristic signals that indicate the characteristic, a characteristic sampling circuit (18) that outputs a standard characteristic signal that indicates the characteristic regarding the prescribed factor when the actuator (12) is in the normal state, and a comparison circuit (16) that outputs a control signal when the difference between the two signals exceeds an allowable range.

16 Claims, 4 Drawing Sheets

(a) NORMAL CONDITION (OUTPUT FROM CHARACTERISTIC SAMPLING CIRCUIT)

(b) DRIVING WAVE FORM UNDER OPEN CONDITION (a) NORMAL CONDITION (OUTPUT FROM CHARACTERISTIC SAMPLING CIRCUIT)

(b) DRIVING WAVE FORM (a) DRIVING WAVE FORM UNDER NORMAL CONDITION (b) DRIVING WAVE FORM WHEN MOUNTING IS UNSTABLE (a) ANALYZED FREQUENCY UNDER NORMAL CONDITION (b) ANALYZED FREQUENCY WHEN MOUNTING IS UNSTABLE

DRIVE DEVICE AND APPARATUS INCORPORATING THE DEVICE

This application is based on application Ser. No. Hei 9-304482 filed in Japan, the content of which is hereby incorporated by reference.

BACKGROUND OF THE INVENTION

1. Field of the Invention

The present invention pertains to a drive device, and particularly to a drive device that employs an electromechanical transducer such as a piezoelectric element, electrostrictive element or magnetostrictive element.

The present invention further pertains to an apparatus equipped with said device, such as an apparatus having an X-Y drive table, a camera, an overhead projector, binoculars, a microscope equipped with a movable object table, and a scanning tunneling electronic microscope having a probe.

2. Description of the Prior Art

Conventionally, various types of drive devices employing an electromechanical transducer such as a piezoelectric element have been proposed. For example, in the drive device 1 shown in FIG. 1, a drive circuit 4 is connected to a piezoelectric linear actuator 2, and the piezoelectric linear actuator 2 is operated based on the prescribed output from the drive circuit 4.

Incidentally, because the drive circuit 4 operates regardless of the state of the piezoelectric linear actuator 2, when a problem occurs with regard to the piezoelectric linear actuator 2, a problem also occurs with regard to the power supply to the piezoelectric linear actuator 2. However, because the drive device cannot consider the state of the piezoelectric linear actuator 2 and the abnormality in the piezoelectric linear actuator 2 cannot be output externally, abnormal driving is continued. When abnormal driving is continued, damage to the drive device can result.

SUMMARY OF THE INVENTION

Therefore, the object of the present invention is to obtain a drive device in which continued abnormal driving may be prevented by detecting abnormalities occurring during the driving of the electromechanical transducer, as well as a mechanism equipped with said device.

One aspect of the present invention provides a drive device equipped with an electromechanical transducer that extends and contracts based on drive signals input from a drive pulse generator, a first member that is fixed to one end of the electromechanical transducer, a driving friction member that is fixed to the other end of the electromechanical transducer, and a second member that frictionally engages with the driving friction member. Either the first or second member is fixed, such that when the electromechanical transducer extends and contracts based on the drive signals, the member that is not fixed is driven in prescribed directions.

In addition, this drive device is equipped with a characteristic signal generator, a detector and a comparator. The characteristic signal generator outputs standard characteristic signals indicating the characteristic pertaining to one or more factors of the drive signals in the normal state. When the drive signals are input to the detector, the characteristic regarding the same factor as that used in generating the standard characteristic signals is detected and the detected characteristic signals that indicate the characteristic are output. The standard characteristic signals and the detected characteristic signals are input to the comparator, where they are compared, and if the difference in characteristic regarding the same factor exceeds a prescribed range, a control signal is output.

In the construction described above, the drive pulse generator extends and contracts the electromechanical transducer such that slipping occurs between the second member and the driving friction member that are engaged via friction, and the relative amounts of movement of the second member and of the driving friction member are different. The second member and the driving friction member may slip by different amounts when the electromechanical transducer extends and contracts, or when it extends or contracts only. Where the first member is fixed, the second member is driven in prescribed directions. Where the second member is fixed, the first member is driven in prescribed directions.

Using this construction, where there is an abnormality with the electromechanical transducer, the drive signals assume a pattern that is different from when the electromechanical transducer is in the normal state, and therefore, the characteristic of the drive signals regarding a factor differs from the one that is obtained when the electromechanical transducer is in the normal state. In other words, when an appropriate factor is selected, the difference between the detected characteristic signals regarding the drive signals actually supplied to the electromechanical transducer and the standard characteristic signals regarding the same drive signals in the normal state exceeds a prescribed range. Based on this, the abnormality can be detected.

Therefore, the abnormality during the driving of the electromechanical transducer can be detected and output externally.

The characteristic of the drive signals can be obtained using various factors as explained in the following examples.

a: The drive pulse generator drives the electromechanical transducer using a constant current. The characteristic regarding a factor is the time required for the voltage of the drive signal to rise and exceed a prescribed threshold after the constant current driving is started.

In this construction, where the electromechanical transducer is in the normal state, the drive signal voltage gradually increases and exceeds the threshold after a prescribed time. However, if the electromechanical transducer is open, i.e., if it is insulated, the voltage increases instantaneously to the maximum voltage after the constant current driving is started, whereby the time required for the voltage increase is essentially zero, which is much less than the time required for the voltage to increase to the threshold when the electromechanical transducer is in the normal state. In addition, if there is a short-circuit in the electromechanical transducer, the voltage does not increase even if the element is driven using a constant current. Consequently, an infinite time is required for the voltage increase, which is much longer than the time needed when the electromechanical transducer is in the normal state. Therefore, if the difference between the actual voltage increase time and the prescribed time exceeds a certain range, it can be determined that an abnormality exists.

b: The drive pulse generator drives the electromechanical transducer using a constant current. The characteristic regarding a factor is the drive signal voltage waveform.

Using this construction, when the wires, etc. of the electromechanical transducer are damaged and the element becomes insulated, or when the electromechanical transducer has experienced insulation breakdown and has a short-circuit, the waveform of the drive signals is clearly different from that of the drive signals when the electromechanical transducer is in its normal state, and it can therefore be determined that an abnormality exists.

c: The drive pulse generator drives the electromechanical transducer using a constant current. The characteristic regarding a factor is the gain of each frequency band by means of frequency analysis regarding the drive signal voltage waveform.

Using this construction, where the mounting of the electromechanical transducer becomes unstable and the drive signal voltage waveform essentially matches the waveform when the electromechanical transducer is in the normal state but includes a high frequency component, the gain of the high frequency band is different from that of the element in the normal state, and therefore, an abnormality can be detected.

These and other objects, advantages and features of the invention will become apparent from the following description thereof taken in conjunction with the accompanying drawings, which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 3:
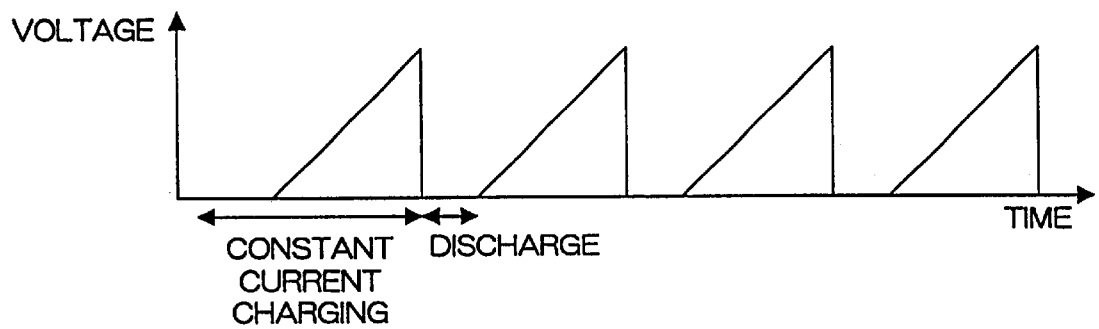
FIG. 3 is a drawing showing the drive signal waveform of the drive device shown in FIG. 2.

The basic construction of a camera C that includes a drive device 10, which is common to all of the embodiments, will first be explained with reference to FIGS. 2 and 3.

Figure 2:
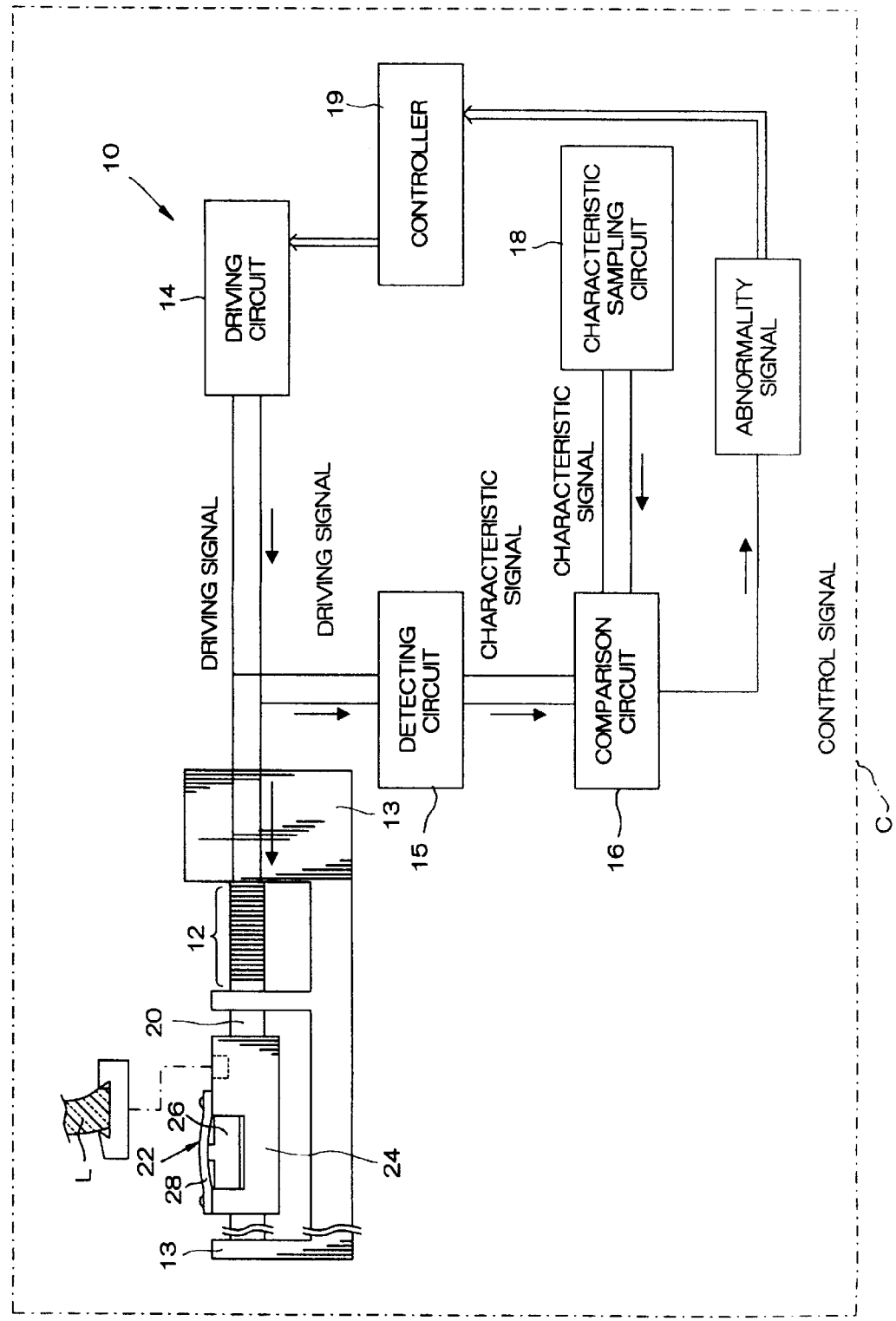
FIG. 2 is a block diagram that is common to all of the embodiments of the present invention.

The drive device 10 has a piezoelectric linear actuator 12, a drive circuit 14 connected to the actuator 12, a detection circuit 15 connected to the actuator 12 and the drive circuit 14, a comparison circuit 16 connected to the detection circuit 15, and a characteristic sampling circuit 18 connected to the comparison circuit 16, as shown in the block diagram of FIG. 2.

The actuator 12 is a known linear actuator that performs driving using the distortion induced by the application of an electric field to an electromechanical transducer such as a piezoelectric element or magnetrostrictive element. It operates based on the drive signals output from the drive circuit 14.

One end of the actuator 12 is glued to a base 13 (first member). To the other end of the actuator 12 is glued a driving friction member 20, which has a rod configuration, and it operates when the actuator 12 operates. The other end of the driving friction member 20 is movably supported by the base 13. A moving member 22 (second member) is frictionally engaged with the driving friction member 20. The moving member 22 comprises a moving portion 24, a pressure member 26 to cause the moving portion 24 to frictionally engage with the driving friction member 20, and a spring 28 to provide frictional force to the pressure member 26. A lens L of the camera C is linked to the moving portion 24 via a connector, such that the lens L operates as the moving member 22 moves.

The drive circuit 14 has a gradual charge circuit for charging at a constant current and a quick discharge circuit which are not shown in the drawings, for example. The circuits operate alternately, repeating gradual charging at a constant current and quick discharging as shown in FIG. 3, and outputs drive signals having a sawtooth configuration. The actuator 12 operates in a prescribed direction by means of these drive signals.

The principle of the operation of the lens L based on the operation of the actuator 12 is disclosed in U.S. Pat. No. 5,589,723 and U.S. Pat. No. 5,587,846, for example, and therefore will not be explained here.

The characteristic sampling circuit 18 extracts the characteristic regarding a prescribed factor from the drive signal voltage waveform when the actuator 12 is in the normal state and outputs a standard characteristic signal.

The drive signals input to the actuator 12 from the drive circuit 14 are input to the detection circuit 15. The detection circuit 15 extracts the characteristic regarding the same factor used by the characteristic sampling circuit 18 from the drive signal voltage waveform and outputs a detected characteristic signal.

The detected characteristic signals from the detection circuit 15 and the standard characteristic signals from the characteristic sampling circuit 18 are input to the comparison circuit 16. The comparison circuit 16 compares the two characteristic signals and determines whether the difference between them is within an allowable range. When it exceeds the allowable range, the comparison circuit 16 outputs a control signal. An appropriate external device, such as an alarm, for example, is operated based on this control signal, and the fact that the drive device 10 is in an abnormal state is output externally.

In other words, this drive device 10 compares the characteristic of the drive signals actually supplied to the actuator 12 with the characteristic of the drive signals when the actuator 12 is normally operating, and based on whether the difference between the characteristics is within an allowable range, it determines whether or not the actuator 12 is performing normal driving. When it is in an abnormal state, a control signal is output as an abnormality signal for external notification.

These various circuits are controlled by a controller 19 (comprising a CPU, for example).

Figure 1:
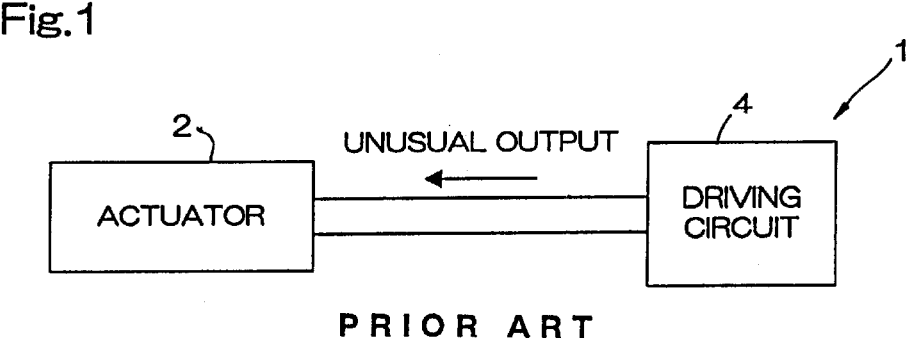
FIG. 1 is a block diagram of a conventional drive device.

In the conventional drive device 1 shown in FIG. 1, the drive signals from the drive circuit 4 are output regardless of the state of the actuator 2, and therefore, the state of the actuator 2 cannot be learned. In contrast, in this present drive device 10, when the state of the actuator 12 is abnormal, said fact is detected and a control signal is output. Consequently, abnormalities can be dealt with appropriately, e.g. the operation of the apparatus is terminated and a warning is issued.

The embodiments to detect an abnormality in the actuator 12 from the characteristic of the drive signals are explained below.

The first embodiment will be explained with reference to FIGS. 4 and 5.

Figure 4:
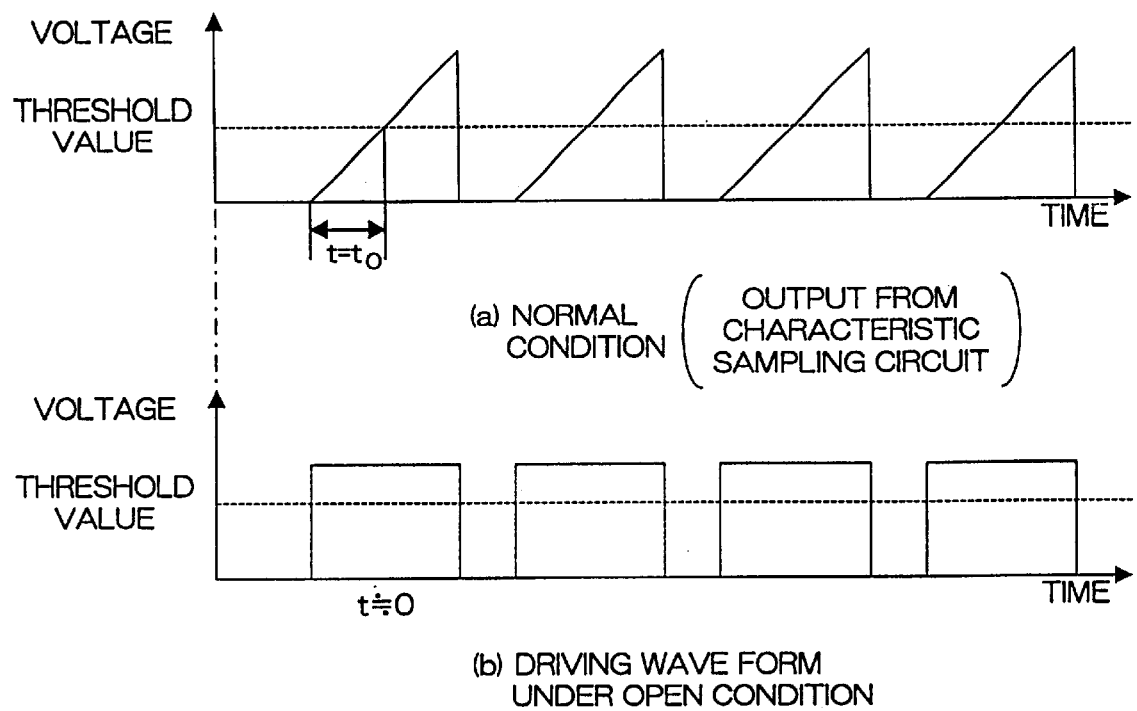
FIG. 4 is a drawing showing the characteristic signal waveform in the first embodiment of the present invention.
Figure 5:
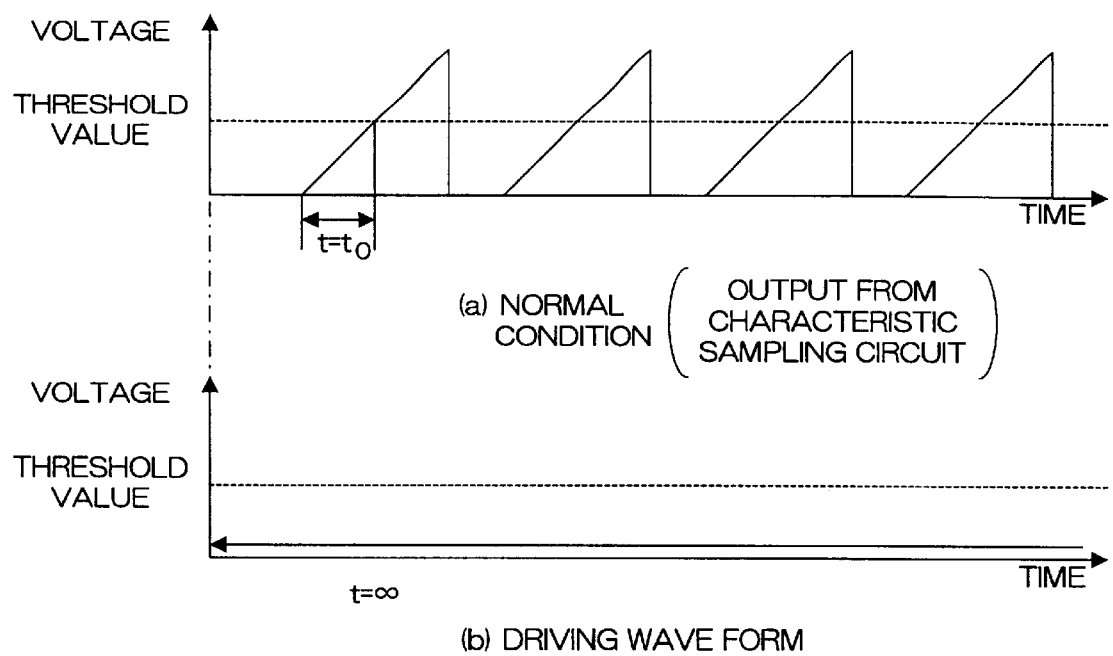
FIG. 5 is a drawing showing the characteristic signal waveform in the first embodiment of the present invention.

As shown in (a) of FIG. 4 and (a) of FIG. 5, a threshold is set regarding the drive signal voltage waveform, and the time (t) that is required for the voltage to exceed the threshold after charging by means of a constant current is begun is deemed the characteristic of the drive signal. The characteristic sampling circuit 18 outputs the voltage increase time (t0) when the actuator 12 is in the normal state as the standard characteristic signal.

The detection circuit 15 detects the time (t) that is required for the voltage to exceed the threshold after charging is begun with regard to the waveform of the drive signal voltage applied to the actuator 12, and outputs a detected characteristic signal. When the difference between the detected characteristic signal from the detection circuit 15 and the standard characteristic signal from the characteristic sampling circuit 18 exceeds the allowable range, the comparison circuit 16 outputs a control signal.

For example, where the actuator 12 is open, charging by means of the constant current takes place instantaneously, and the drive signal assumes a rectangular shape, as shown in (b) of FIG. 4, in which the voltage increase time (t) is very short, essentially zero. Therefore, the difference between the two characteristic signals is large, and the comparison circuit 16 detects an abnormality and outputs a control signal. An open state here refers to a state in which wires, etc., are damaged and the electromechanical transducer of the piezoelectric linear actuator 12 becomes electrically insulated.

Where there is a short-circuit in the actuator 12, charging by means of the constant current does not take place, and the voltage does not increase. In this case, regarding the drive signals, an infinite time (t) is required for the voltage to exceed the threshold after charging is begun. Therefore, the difference between the two characteristic signals becomes large, and the comparison circuit 16 detects an abnormality and outputs a control signal. A short-circuited state here refers to a state where the electromechanical transducer has experienced insulation breakdown and is electrically connected.

Therefore, the abnormal state of the actuator 12 can be discovered.

The second embodiment is explained below with reference to FIGS. 6 and 7.

In the second embodiment, frequency analysis is performed regarding the drive signal voltage waveform, and the gain of each frequency band is deemed the characteristic of the drive signal. In other words, the characteristic sampling circuit 18 outputs the gain in each frequency band in the normal state as the standard characteristic signal. The detection circuit 15 outputs the gain in each frequency band for the drive signal as the detected characteristic signal. If the difference between the two characteristic signals exceeds a prescribed range, the comparison circuit 16 determines the existence of an abnormality and outputs a control signal.

Figure 6:
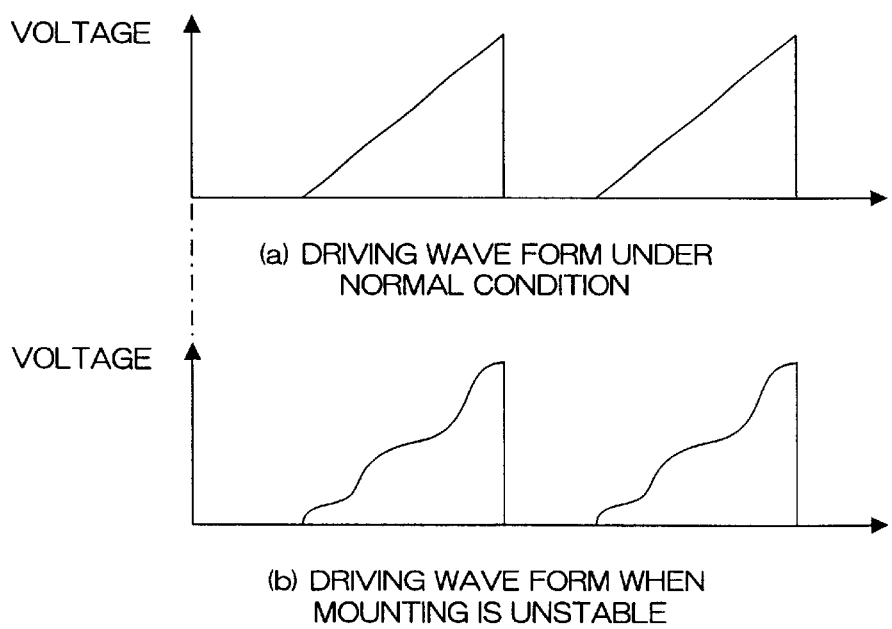
FIG. 6 is a drawing showing the characteristic signal waveform in the second embodiment of the present invention.
Figure 7:
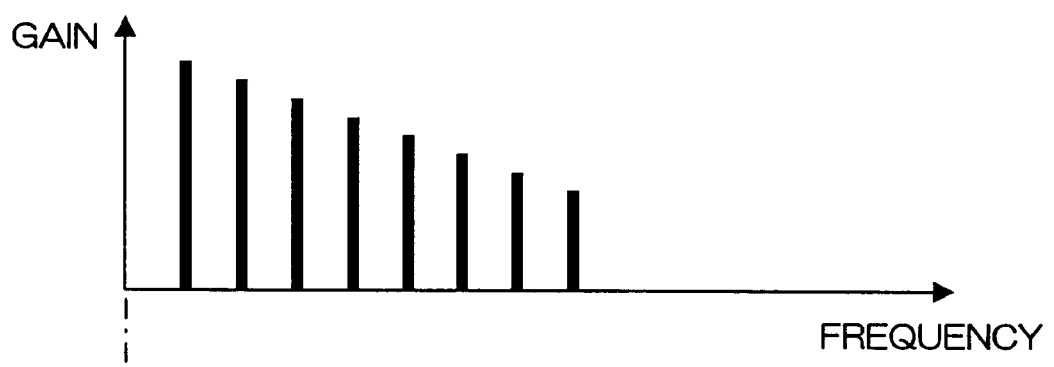
FIG. 7 is a drawing showing the frequency analysis in the second embodiment of the present invention.
Figure 7:
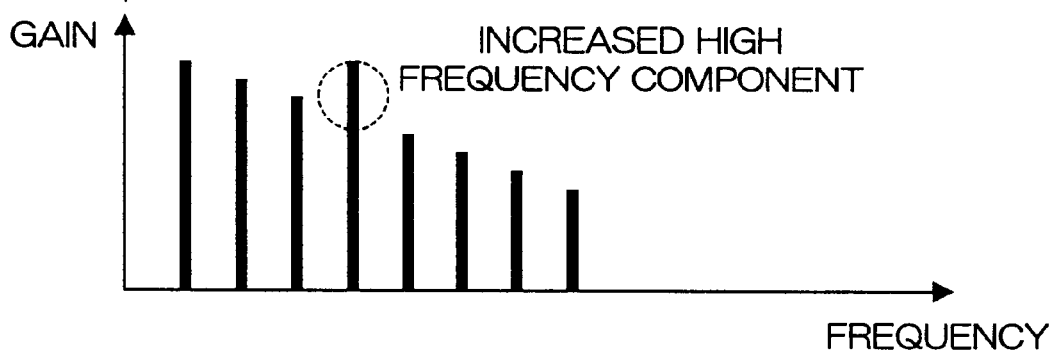

For example, as shown in (a) of FIG. 6, where the actuator 12 is driven using a drive signal having a sawtooth waveform, as in the first embodiment, as a result of frequency analysis, the gain becomes smaller as the frequency increases as shown in (a) of FIG. 7.

However, if the mounting of the actuator 12 becomes unstable, the characteristic of the piezoelectric linear actuator 12 changes, and the resonant frequency of the drive signal increases and a high frequency component is added to the drive signal voltage waveform, as shown in (b) of FIG. 6. Therefore, when frequency analysis is performed, the gain in a high frequency band increases as shown in (b) of FIG. 7, in contrast with the result of frequency analysis when the actuator 12 is in the normal state. By detecting the gain increase in the high frequency band, the comparison circuit 16 detects the abnormality of the actuator 12 and outputs a control signal externally.

As explained above, in the embodiments, through the monitoring of the drive signals to the actuator 12, abnormalities occurring during the driving of the actuator 12 can be detected and output externally.

The present invention is not limited to the embodiments described above, and may be implemented in various other forms. For example, the characteristics of the drive signals can be compared with regard to various factors. In addition, the circuits 14, 15, 16 and 18 may comprise independent circuits, but may also be constructed by means of the control of a microcomputer at least part of which has equivalent functions.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An apparatus comprising:
   an electromechanical transducer for extending or contracting based on drive signals inputted thereto;
   a drive pulse generator for supplying the drive signals to said electromechanical transducer;
   a first member which is fixed to a first end of said electromechanical transducer;
   a driving friction member which is fixed to a second end of said electromechanical transducer in opposition to said first member;
   a second member which frictionally engages with said driving friction member;
   a characteristic signal generator for generating standard characteristic signals indicative of a characteristic of one or more factors of the drive signals in a normal state, and for outputting the standard characteristic signals;
   a detector for detecting an actual characteristic of the one or more factors of the drive signals, and for outputting actual characteristic signals indicative of the detected actual characteristic; and
   a comparator for comparing the thus generated standard characteristic signals and the thus outputted actual characteristic signals, and for outputting a control signal which indicates a malfunction of the apparatus if a difference in the standard characteristic signals and the actual characteristic signals exceeds a prescribed range.

2. An apparatus according to claim 1, wherein said drive pulse generator drives the electromechanical transducer by means of a constant current.

3. An apparatus according to claim 2, wherein said characteristic of the one or more factors is a time required for a voltage of the drive signals to rise and exceed a prescribed threshold after a constant current driving is started.

4. An apparatus according to claim 2, wherein said characteristic of the one or more factors is a drive signal voltage waveform.

5. An apparatus according to claim 2, wherein said characteristic of the one or more factors is a gain of each frequency band by means of frequency analysis regarding a drive signal voltage waveform.

6. An apparatus according to claim 1, wherein said characteristic of the one or more factors is a time required for a voltage of the drive signals to rise and exceed a prescribed threshold after a constant current driving is started.

7. An apparatus according to claim 1, wherein said characteristic of the one or more factors is a drive signal voltage waveform.

8. An apparatus according to claim 1, wherein said characteristic of the one or more factors is a gain of each frequency band by means of frequency analysis regarding a drive signal voltage waveform.

9. An apparatus according to claim 1, wherein said control signal is employed to provide a warning.

10. An apparatus according to claim 1, wherein said apparatus is a camera.

11. An apparatus comprising:

an electromechanical transducer for extending or contracting based on drive signals inputted thereto;

a drive pulse generator for supplying the drive signals to said electromechanical transducer;

a first member which is fixed to a first end of said electromechanical transducer;

a driving friction member which is fixed to a second end of said electromechanical transducer in opposition to said first member;

a second member which frictionally engages with said driving friction member;

a characteristic signal generator for generating standard characteristic signals indicative of a characteristic of one or more factors of the drive signals in a normal state, and for outputting the standard characteristic signals;

a detector for detecting an actual characteristic of the one or more factors of the drive signals, and for outputting actual characteristic signals indicative of the detected actual characteristic;

a comparator for comparing the thus generated standard characteristic signals and the thus outputted actual characteristic signals, and for outputting a control signal if a difference in the standard characteristic signals and the actual characteristic signals exceeds a prescribed range; and a controller for controlling operation of said apparatus based on the control signal thus outputted from said comparator;

wherein said drive pulse generator drives the electromechanical transducer by means of a constant current, and wherein said characteristic of the one or more factors is a time required for a voltage of the drive signals to rise and exceed a prescribed threshold after a constant current driving is started.

12. An apparatus comprising:

an electromechanical transducer for extending or contracting based on drive signals inputted thereto;

a drive pulse generator for supplying the drive signals to said electromechanical transducer;

a first member which is fixed to a first end of said electromechanical transducer;

a driving friction member which is fixed to a second end of said electromechanical transducer in opposition to said first member;

a second member which frictionally engages with said driving friction member;

a characteristic signal generator for generating standard characteristic signals indicative of a characteristic of one or more factors of the drive signals in a normal state, and for outputting the standard characteristic signals;

a detector for detecting an actual characteristic of the one or more factors of the drive signals, and for outputting actual characteristic signals indicative of the detected actual characteristic;

a comparator for comparing the thus generated standard characteristic signals and the thus outputted actual characteristic signals, and for outputting a control signal if a difference in the standard characteristic signals and the actual characteristic signals exceeds a prescribed range; and a controller for controlling operation of said apparatus based on the control signal thus outputted from said comparator;

wherein said drive pulse generator drives the electromechanical transducer by means of a constant current, and wherein said characteristic of the one or more factors is a gain of each frequency band by means of frequency analysis regarding a drive signal voltage waveform.

13. An apparatus comprising:

an electromechanical transducer for extending or contracting based on drive signals inputted thereto;

a drive pulse generator for supplying the drive signals to said electromechanical transducer;

a first member which is fixed to a first end of said electromechanical transducer;

a driving friction member which is fixed to a second end of said electromechanical transducer in opposition to said first member;

a second member which frictionally engages with said driving friction member;

a characteristic signal generator for generating standard characteristic signals indicative of a characteristic of one or more factors of the drive signals in a normal state, and for outputting the standard characteristic signals;

a detector for detecting an actual characteristic of the one or more factors of the drive signals, and for outputting actual characteristic signals indicative of the detected actual characteristic;

a comparator for comparing the thus generated standard characteristic signals and the thus outputted actual characteristic signals, and for outputting a control signal if a difference in the standard characteristic signals and the actual characteristic signals exceeds a prescribed range; and a controller for controlling operation of said apparatus based on the control signal thus outputted from said comparator;

wherein said characteristic of the one or more factors is a time required for a voltage of the drive signals to rise and exceed a prescribed threshold after a constant current driving is started.

14. An apparatus comprising:

an electromechanical transducer for extending or contracting based on drive signals inputted thereto;

a drive pulse generator for supplying the drive signals to said electromechanical transducer;

a first member which is fixed to a first end of said electromechanical transducer;

a driving friction member which is fixed to a second end of said electromechanical transducer in opposition to said first member;

a second member which frictionally engages with said driving friction member;

a characteristic signal generator for generating standard characteristic signals indicative of a characteristic of one or more factors of the drive signals in a normal state, and for outputting the standard characteristic signals;

a detector for detecting an actual characteristic of the one or more factors of the drive signals, and for outputting actual characteristic signals indicative of the detected actual characteristic;

a comparator for comparing the thus generated standard characteristic signals and the thus outputted actual characteristic signals, and for outputting a control signal if a difference in the standard characteristic signals and the actual characteristic signals exceeds a prescribed range; and a controller for controlling operation of said apparatus based on the control signal thus outputted from said comparator;

wherein said characteristic of the one or more factors is a gain of each frequency band by means of frequency analysis regarding a drive signal voltage waveform.

15. An apparatus comprising:

an electromechanical transducer for extending or contracting based on drive signals inputted thereto;

a drive pulse generator for supplying the drive signals to said electromechanical transducer;

a first member which is fixed to a first end of said electromechanical transducer;

a driving friction member which is fixed to a second end of said electromechanical transducer in opposition to said first member;

a second member which frictionally engages with said driving friction member;

a characteristic signal generator for generating standard characteristic signals indicative of a characteristic of one or more factors of only the drive signals in a normal state, and for outputting the standard characteristic signals;

a detector for detecting an actual characteristic of the one or more factors of only the drive signals, and for outputting actual characteristic signals indicative of the detected actual characteristic;

a comparator for comparing only the thus generated standard characteristic signals and the thus outputted actual characteristic signals, and for outputting a control signal if a difference in the standard characteristic signals and the actual characteristic signals exceeds a prescribed range; and a controller for controlling operation of said apparatus based on the control signal thus outputted from said comparator.

16. A drive device comprising:

an electromechanical transducer for extending or contracting based on drive signals inputted thereto;

a first member which is fixed to a first end of said electromechanical transducer;

a driving friction member which is fixed to a second end of said electromechanical transducer in opposition to said first member;

a second member which frictionally engages with said driving friction member;

a characteristic signal generator for generating standard characteristic signals indicative of a characteristic of one or more factors of only the drive signals in a normal state, and for outputting the standard characteristic signals;

a detector for detecting an actual characteristic of the one or more factors of only the drive signals, and for outputting actual characteristic signals indicative of the detected actual characteristic; and a comparator for comparing only the thus generated standard characteristic signals and the thus outputted actual characteristic signals, and for outputting a control signal if a difference in the standard characteristic signals and the actual characteristic signals exceeds a prescribed range.

* * * * *